United States Patent
Lee et al.

(10) Patent No.: US 7,903,527 B2
(45) Date of Patent: Mar. 8, 2011

(54) RECORDING MEDIUM USING REFERENCE PATTERN, RECORDING/REPRODUCING METHOD OF THE SAME AND APPARATUS THEREOF

(75) Inventors: Jae Sung Lee, Seongnam-si (KR); Young Soo Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 282 days.

(21) Appl. No.: 12/213,533

(22) Filed: Jun. 20, 2008

(65) Prior Publication Data

US 2009/0010133 A1      Jan. 8, 2009

(30) Foreign Application Priority Data

Jun. 22, 2007 (KR) .................... 10-2007-0061498
Aug. 21, 2007 (KR) .................... 10-2007-0083889

(51) Int. Cl.
*G11B 7/00* (2006.01)
(52) U.S. Cl. ........................................... 369/103
(58) Field of Classification Search ............ None
See application file for complete search history.

(56) References Cited

U.S. PATENT DOCUMENTS

| | | | | |
|---|---|---|---|---|
| 6,064,586 A | * | 5/2000 | Snyder et al. | 365/125 |
| 7,656,564 B2 | * | 2/2010 | Yoon | 358/483 |
| 2008/0019251 A1 | * | 1/2008 | Choi et al. | 369/103 |

FOREIGN PATENT DOCUMENTS

| | | |
|---|---|---|
| CN | 1713283 | 12/2005 |
| KR | 10-0717065 | 5/2007 |

OTHER PUBLICATIONS

Chinese Office Action dated Dec. 27, 2010 issued in corresponding Chinese Application No. 200810128686.7.

* cited by examiner

*Primary Examiner* — Joseph Haley
(74) *Attorney, Agent, or Firm* — Harness, Dickey & Pierce, P.L.C.

(57) ABSTRACT

A recording medium, a recording/reproducing method of the same and an apparatus therefor, by which data of high volume can be recorded/reproduced. The present invention includes the steps of inserting a reference pattern including a multiple divided areas in a data image and recording the data image in the recording medium, wherein the multiple divided areas are in a relation of inversion and/or rotation and/or symmetrization.

16 Claims, 11 Drawing Sheets

FIG. 5 slop_lc = 0.3032
slop_rc = 0.2878
slop_uc = 0.2530
slop_dc = 0.2400

RECORDING MEDIUM USING REFERENCE PATTERN, RECORDING/REPRODUCING METHOD OF THE SAME AND APPARATUS THEREOF

This application claims the benefit of the Korean Patent Application No. 10-2007-0061498, filed on Jun. 22, 2007 and the Korean Patent Application No. 10-2007-0083889, filed on Aug. 21, 2007, which are hereby incorporated by reference as if fully set forth herein.

BACKGROUND OF THE INVENTION

1. Field of the Invention

The present invention relates to a recording medium, a recording/reproducing method of the same and an apparatus therefor, and more particularly, to a recording medium recording/reproducing method using holography and recording medium recording/reproducing apparatus using holography.

2. Discussion of the Related Art

Generally, the recent technological developments brings a recording medium of high capacity and density. As examples for the recording medium, there are CD (compact disc), DVD (digital versatile disc) and the like. Moreover, there is a next generation recoding medium having a considerably enhanced recording capacity such as BD (Blu-ray disc), a recording medium using holography and the like. In case of the recording medium using holography, it is able to record data on a volume of the recording medium using diffraction and interference characteristics of light by overlapping the data. Therefore, it is able to remarkably increase a capacity of the recording medium.

However, apparatus and method for detecting data shift, data distortion and the like more accurately and compensating the data are required for reconstructing/reproducing the data.

SUMMARY OF THE INVENTION

Accordingly, the present invention is directed to a recording medium, a recording/reproducing method of the same and an apparatus therefor that substantially obviate one or more problems due to limitations and disadvantages of the related art.

An object of the present invention is to provide a recording medium, a recording/reproducing method of the same and an apparatus therefor, by which data of high volume can be recorded/reproduced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording method of a recording medium according to the present invention includes the steps of inserting a reference pattern including a multiple divided areas in a data image and recording the data image in the recording medium, wherein the multiple divided areas are in a relation of inversion and/or rotation and/or symmetrization.

Preferably, the reference pattern is inserted in the data image by reflecting a distortion characteristic of a recording/reproducing device.

More preferably, the reference pattern inserting step includes the steps of measuring the distortion characteristic of the recording/reproducing device using a test image, determining an inter-reference pattern space within the data image according to the measured distortion characteristic, and recording the reference pattern by inserting the reference pattern in the data image according to the determined space.

In this case, the test image may be configured in a manner of the reference pattern is arranged by equally spaced in horizontal and vertical directions.

And, the distortion characteristic measuring step includes the steps of recording the test image, reproducing the test image, and comparing the recorded test image and the reproduced test image to each other.

In this case, the test image comparing step includes the step of finding a position shift of a corresponding reference pattern within the test image before and after reproduction of the corresponding reference pattern.

And, the position shift finding step includes the step of finding a shift distance and a shift direction.

Preferably, the number of 'on' of the reference pattern is equal to the number of 'off' of the reference pattern.

Preferably, the reference pattern is used in different shapes within a single data image.

More preferably, the reference patterns in the different shapes are in the relation of the inversion and/or the rotation and/or the symmetrization in-between.

Preferably, the reference pattern differing in shape is inserted in each of a plurality of data images.

More preferably, the reference patterns of each of a plurality of the data images are in the relation of the inversion and/or the rotation and/or the symmetrization in-between.

Preferably, information on a position of the recorded reference pattern and pattern information of the reference pattern are recorded in the recording medium.

In another aspect of the present invention, a reproducing method of a recording medium includes the steps of reading a data image including a reference pattern including a multiple divided areas in a data image and reproducing the data image using the reference pattern, wherein the multiple divided areas are in relation of inversion and/or rotation and/or symmetrization.

Preferably, the data image reproducing step includes the step of correcting a position of the data image.

More preferably, the data image correcting step includes the step of correcting the data image by comparing a position and shape of the reproduced reference pattern to those of the recorded reference pattern.

Preferably, the number of 'on' of the reference pattern is equal to the number of 'off' of the reference pattern.

In another aspect of the present invention, a recording apparatus for a recording medium includes a control unit inserting a reference pattern including a multiple divided areas in a data image and a light outputting unit recording the data image in the recording medium, wherein the multiple divided areas are in a relation of inversion and/or rotation and/or symmetrization.

Preferably, the control unit measures the distortion characteristic of the recording device using a test image, determines an inter-reference pattern space within the data image according to the measured distortion characteristic, and records the reference pattern by inserting the reference pattern in the data image according to the determined space.

More preferably, the control unit configures the test image by arranging the reference pattern in 2-dimension and equally spacing the reference pattern.

More preferably, the control unit measures the distortion characteristic in a manner of recording the test image, reproducing the test image, and comparing the recorded test image and the reproduced test image to each other.

In this case, the control unit compares a recorded test image and a reproduced test image to each other by finding a shift between a recorded position and a reproduced position of the corresponding reference pattern within the test image.

And, the control unit finds the shift between the positions by finding a shift distance and a shift direction of the reference pattern.

In another aspect of the present invention, a reproducing apparatus for a recording medium includes a light detecting unit reading a data image including a reference pattern including a multiple divided areas in a data image and a control unit reproducing the data image using the reference pattern, wherein the multiple divided areas are in relation of inversion and/or rotation and/or symmetrization.

Preferably, the control unit reproduces the data image by correcting a position of the data image.

Preferably, the control unit corrects the data image by correcting the data image by comparing a position and shape of the reproduced reference pattern to those of the recorded reference pattern.

In a further aspect of the present invention, a recording medium includes a data area having a reference pattern and user data recorded therein and a control area including information on the reference pattern, wherein the reference pattern includes a multiple divided areas in a data image and wherein the multiple divided areas are in a relation of inversion and/or rotation and/or symmetrization.

Preferably, the information on the reference pattern includes position information indicating a position having the reference pattern recorded thereat.

Preferably, the information on the reference pattern includes a shape of the reference pattern.

Preferably, the information on the reference pattern reflects optical distortion characteristic of a recording device of the recording medium.

Accordingly, the present invention provides the following effects and/or advantages.

First of all, the present invention effectively compensates a data image and facilitates micro-distortion and the like to be detected and compensated, thereby enhancing q quality of reproduced data.

Secondly, the present invention measures a distortion extent according to a system configuration, thereby effectively compensating for the distortion.

Thirdly, the present invention performs a recording on a recording medium by reflecting characteristics of a recording apparatus, thereby enabling an additional recording or reproduction by considering the corresponding recording.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the present invention, 'recording medium' means every recordable medium. For instance, 'recording medium' has a meaning that embraces every medium such as a disc, magnetic tape and the like regardless of a recording type or system. For clarity and convenience of the following description, a disc, and more particularly, 'holography recording medium' is used as a recording medium for example. And, it is understood that the technical idea of the present invention is applicable to other recording media as well.

Figure 1:
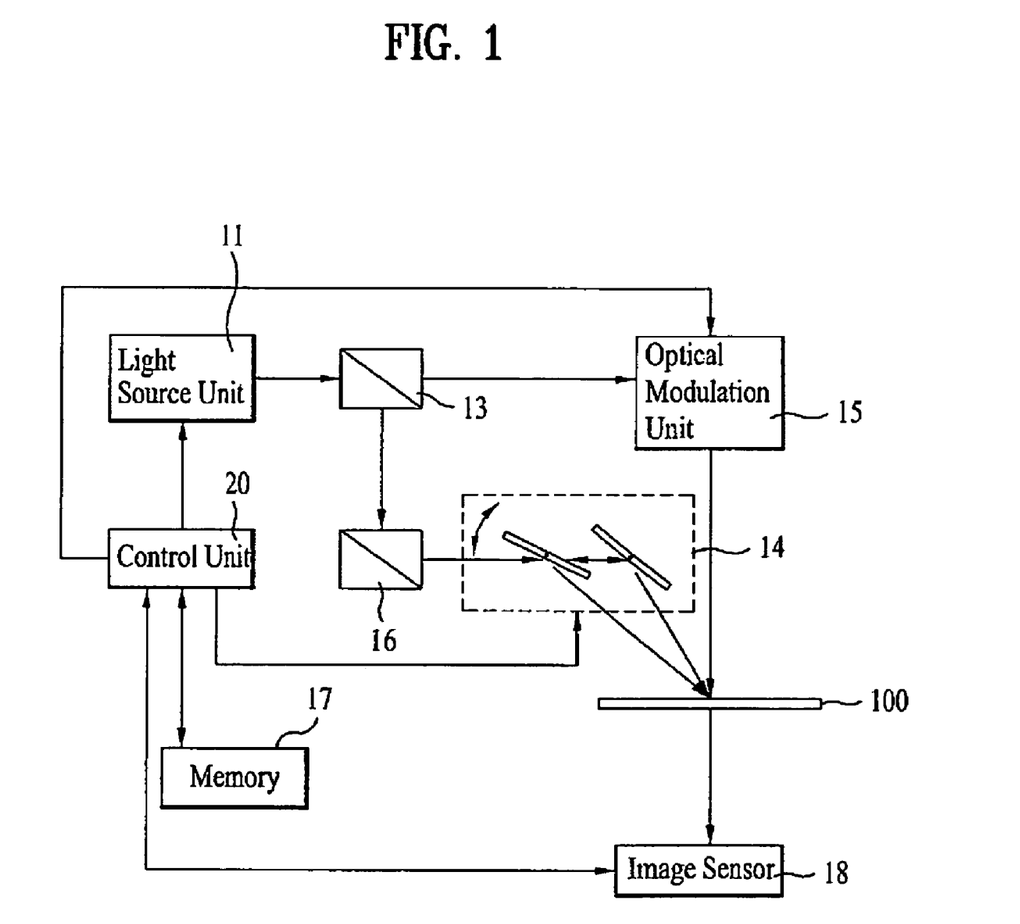
FIG. 1 is a block diagram of a recording medium recording and/or reproducing apparatus according to one embodiment of the present invention.

FIG. 1 is a block diagram of a recording medium recording and/or reproducing apparatus according to one embodiment of the present invention. In FIG. 1, general elements for the apparatus are omitted but the necessary elements for describing the technical points of the present invention are just shown.

Referring to FIG. 1, a recording medium recording/reproducing apparatus according to the present invention includes a light source unit 11, a first light splitting unit 13, a second light splitting unit 16, a reference light adjusting unit 12, an optical modulation unit 15, a memory 17, an image sensor 18, and a control unit 20.

The light source unit 11 includes a gas laser, a solid state laser, a semiconductor laser, a semiconductor diode or the like for generating such a light having high interference as a laser beam and the like. Moreover, a lens for collecting the light outputted from the light source unit 11 not to be dispersed can be provided to an output terminal side. In this case, the lens may include collimator lens for instance.

The first light splitting unit 13 receives the light outputted from the light source unit 11 and then splits the received light into a signal light and a reference light. The first light splitting unit 13 includes at least one transparent substrate and at least one grating layer for diffracting light. Alternatively, the first light splitting unit 13 can include a mirror for reflecting a portion of light and allowing the rest of the light to pass through. A portion of the light passing through the first light splitting unit 13 is incident on the second light splitting unit 16 and the rest of the light is incident on the optical modulation unit 15.

The optical modulation unit 15 generates a signal light containing data using the light outputted from the first light splitting unit 13 under the control of the control unit 20. For clarity and convenience, the signal light containing the data can be named 'first light'. For instance, the optical modulation unit 15 can contain binary data represented as white and black dots. In this case, for clarity and convenience, the white dot can be named 'on' and the black dot can be named 'off', or vice versa.

The first light can contain data. In this case, the data can include a series of data including user data to be recorded. The data to be recorded can include control information and a mark for indicating a section of data as well as the user data. And, a reference pattern can be included. This reference pattern can play a role in correcting other data recorded in a recording medium 100 in recording/reproducing the recording medium 100. And, the reference pattern can be recorded in a manner of being inserted in data. In this case, data relevant to position and shape of the recorded reference pattern can be recorded in such a storage space as a memory of the recording apparatus. Alternatively, the data relevant to position and shape of the recorded reference pattern can be recorded in such a specific area as a control area of the recording medium and a management area of the recording medium.

Moreover, the data generated by the optical modulation unit 15 can include data having a 2-dimensional image. This data, for clarity and convenience, can be named 'data image'. The data image can be represented using the above-mentioned binary data of on/off. And, the optical modulation unit 15 is able to control data image by pixel unit or pixel block unit to represent each pixel of the data image as binary dots.

While the first light, which is the signal beam having the above mentioned characteristics, is applied to the recording medium 100, a second light is incident on the recording medium 100. The beam outgoing from the first light splitting unit 13 is incident on the second light splitting unit 16 and the light outgoing from the second light splitting unit 16 is the second light. Then the second light is incident on the recording medium 10 via the light adjusting unit 14.

The second light can be named a reference beam. The reference beam may mean the beam causing interference with the first light in recording data on the recording medium 100. Alternatively, the reference beam may mean the beam used in reading data from the recording medium 100. Yet, the reference beam, as shown in FIG. 1, can be emitted from the same light source.

The light adjusting unit 14 plays a role in applying the second light to the recording medium 100 by adjusting an incident angle, direction, wavelength and phase of the second light an the like under the control of the control unit 20.

In this case, a different interference pattern is recorded on the recording medium 100 according to the phase and wavelength of the reference beam. Therefore, it is able to record the different interference patterns on the same area of the recording medium iteratively by overlapping them in a manner of varying the phase or wavelength of the reference beam. Hence, it is able to increase a capacity of the holography recording medium using such a characteristic. Namely, it is able to record a plurality of data on a single area.

Besides, as an element including the whole characteristics of the light source 11 and the first light splitting unit 13, the element named 'first light outputting unit' is usable for the present invention. And, as an element including the whole characteristics of the light source 11, the second light splitting unit 16 and the light adjusting unit 14, the element named 'second light outputting unit' is usable for the present invention.

In performing a recording on the recording medium, both of the first light splitting unit 13 and the second light splitting unit 16 should be used. Yet, in reproducing the recording medium, it is able to read an image recorded in the recording medium using the reference beam only. Therefore, according to the present invention, it is able to use the second light splitting unit 16 only in reproducing the recording medium.

In case of reproduction, it is able to read information by applying the light having the same phase and wavelength of the former light used for recording. Therefore, the phase and wavelength of the light used for recording, an incident angle of the light adjusting unit and the like can be recorded or stored in the memory 17.

Data to be recorded can be recorded in the recording medium in form of a data image. When the data image is recorded by being overlapped in the same area, it is able to name each recorded data image 'data page'.

The memory 17 can store data to be recorded in the recording medium. And, the memory 17 can store information in the data to be recorded in the recording medium 100 as well as the user data. For instance, a shape of the reference pattern or the like can be stored in the memory 17.

The image sensor 18 can include a photo detector such as a charge-coupled device (CCD), a CMOS and the like. And, the image sensor 18 can include a plurality of photo detectors. For instance, the image sensor 18 can include a plurality of photo detectors capable of providing resolution of 300*200, 1000*800 or the like.

The image sensor 18 receives the light, which passed through or was reflected on the recording medium 100, and then captures/reads out the data image contained in the received light. For instance, the image sensor 18 shown in FIG. 1 receives the light having passed through the recording medium 100. The image sensor 18 may receive a phase conjugate signal light (corresponding to the data image) generated in a direction of reflection from the recording medium. And, the image sensor 18 can be named 'light receiving unit'.

The control unit 20 reads data from the memory 17 or the recording medium or generates new data. The control unit 20 then provides the corresponding data to the optical modulation unit 15.

The control unit 20 controls the optical modulation unit 15 to generate a 2-dimensional bitmap represented as black and white dots from the data having been read from the memory 17.

The control unit 20 controls the light adjusting unit 14 to adjust strength, incident angle, phase and wavelength of the second light that causes the interference with the first light. As mentioned in the foregoing description, by controlling the light adjusting unit 14, it is able to store a plurality of data images (data pages) in the same area of the recording medium 100. The control unit 20 controls the light adjusting unit 14 to reproduce the data image stored in the recording medium 10 by applying the beam having the same condition for the recording.

The control unit 20 is able to detect light strength (luminance) of each 2-dimensional direction (i.e., direction-x (horizontal) and direction-y (vertical)) of sample data read by the image sensor 18.

The control unit 20 is able to insert a reference pattern in the data incident on the photo modulation unit 15. In this case, the reference pattern can be generated and inserted according to a predetermined rule, which will be explained later. The control unit 20 can store information on a shape and inserted position of the reference pattern in the memory 17. The control unit 20 reads the recorded reference pattern and then uses it in correcting other data except the reference pattern. In particular, the control unit 20 is able to correct the data image using the reference pattern. For instance, the control unit 20 is able to correct the data image in a manner of reading the reference pattern data from the recording medium 100 and then comparing the reference pattern data with the data stored in the memory 17. In this case, targets of the comparison can include shapes and positions of the reference pattern.

The control unit 20 is able to determine distortion characteristics of the recording apparatus using a test image. This is enabled by recording/reproducing the test image on the recording medium. The control unit 20 controls the photo modulation unit 15 to generate a test image and then records the test image in the recording apparatus. The control unit 20 is able to record the measured distortion characteristics in the recording medium or the recording apparatus. And, the control unit 20 is able to determine an interval of the reference pattern inserted in the data image according to the distortion characteristics.

Besides, the recording medium 100 according to the present invention can include a disc or volume type recording medium.

FIGS. 2A to 2D are diagrams for a reference pattern 200 according to one embodiment of the present invention. Specifically, FIGS. 2A to 2D depict rules for reference pattern generation as an embodiment instead of representing a reference pattern of the present invention by pixel unit.

The reference pattern according to the present invention includes multiple divided areas. And, there may exist a predetermined rule between the divided areas. Since the reference pattern includes the multiple divided areas having the predetermined rule in-between, the symmetry, repetitiveness and correction are facilitated. A size of the reference pattern can be defined as pixels, which may vary according to a size of a data image and an extent for correction.

The reference pattern according to the present invention can include multiple divided areas. As embodiments for this, FIGS. 2A to 2D show configurations of the reference pattern having four divided areas.

Each of the reference patterns shown in FIGS. 2A to 2D includes four divided areas. After one of the four divided areas 210, 220, 230 and 240 shown in FIG. 2 has been generated, it is able to generate the rest of three areas using the generated divided area. This is applicable to multiple divided areas as well as the four divided areas. And, the reference pattern can be generated in a manner that the number of 'on' is equal to that of 'off'. This is for stabilization of center frequency in recording/reproducing data.

Once a divided area is determined in the reference pattern 200 including four divided areas, the rest of three divided areas can be generated through inversion, rotation, symmetrization or the like. In this case, the inversion means that brightness is changed. In particular, 'on' can be changed into 'off', and vice versa. The rotation means that the generated divided area is rotated at a predetermined angle. For instance, a single divided area is rotated at 90°, 180° or 270° to be applied to another divided area. And, the symmetrization means right-to-left symmetrization or top-to-bottom symmetrization. The inversion, rotation and symmetrization can be applied separately or by combining at least two rules together. In particular, if a single area is generated, the rest of three areas can be generated by inversion, rotation and symmetrization or by combining inversion and rotation or inversion and symmetrization together. For instance, in order to equalize the digits of 'on' and 'off' of the reference pattern, it is able to use the inversion twice.

Figure 2A:
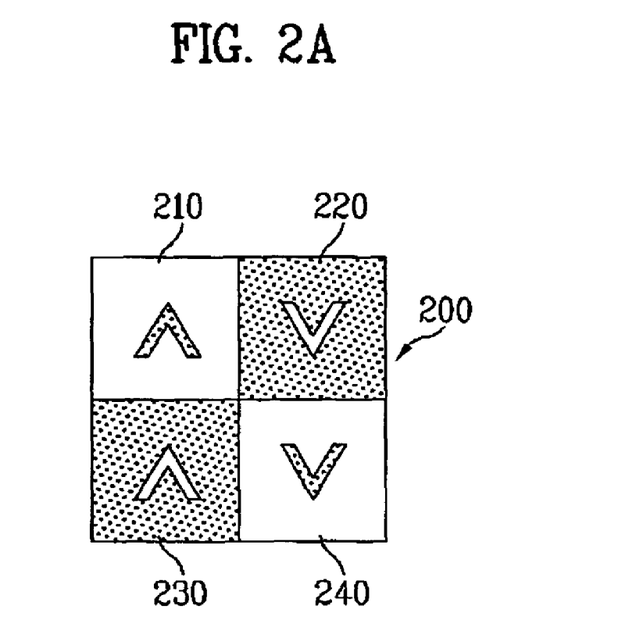
FIGS. 2A to 2D are diagrams for a reference pattern 200 according to one embodiment of the present invention.

FIG. 2A shows a reference pattern including four divided areas according to one embodiment of the present invention. For clarity and convenience of description, a divided area 210 at a left top in four divided area is taken as a reference for the following description.

Referring to FIG. 2A, the divided area 210 at the left top and a divided area 220 at a right top use the inversion and symmetrization of the aforesaid rules. In particular, 'on' and 'off' are inversed and top-to-bottom symmetrization is used. A divided area 230 at a left bottom is configured by inversing the divided area at the left top. And, a divided area 240 at a right bottom is configured by symmetrizing the divided area 210 at the left top.

Figure 2B:
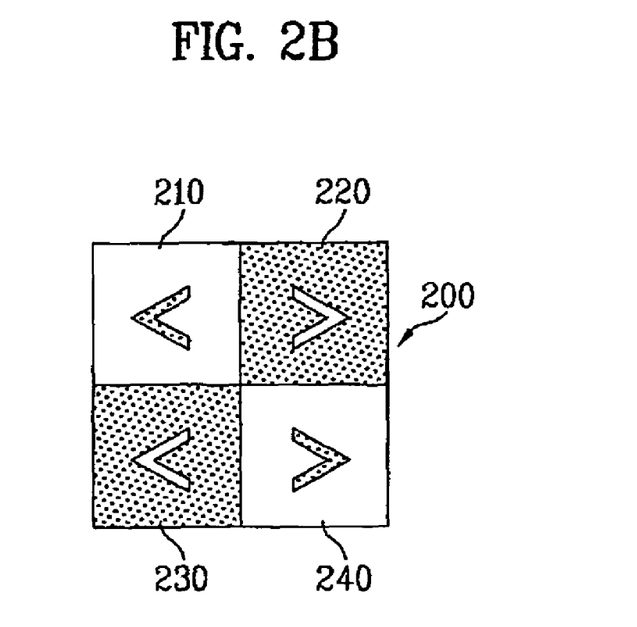

FIG. 2B shows a reference pattern including four divided areas according to one embodiment of the present invention.

Referring to FIG. 2B, a divided area 2220 at a right top 220 is configured by performing inversion and right-to-left symmetrization on a divided area 210 at a left top. And, a divided area 230 at a left bottom is configured by performing inversion on the divided area 210 at the left top. Moreover, a divided area 240 at a right bottom is configured by performing right-to-left symmetrization on the divided area 210 at the left top.

Figure 2C:
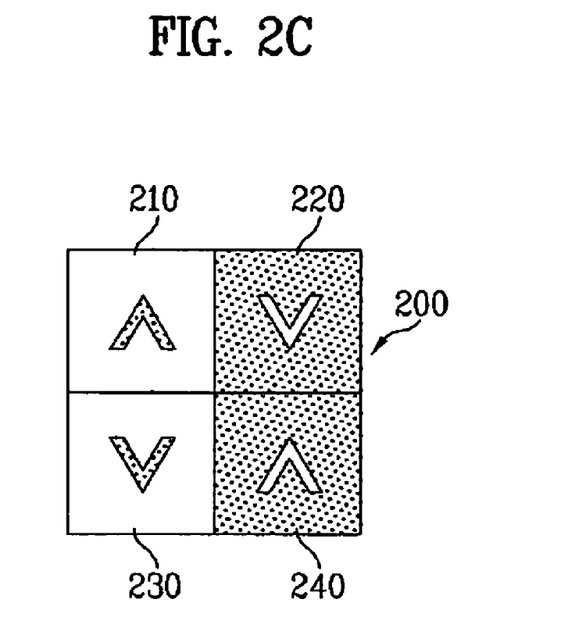

FIG. 2C shows that a divided area 220 at a right top is configured by performing inversion and top-to-bottom symmetrization on a divided area 210 at a left top. And, a divided area 230 at a left bottom is configured by symmetrizing the divided area 210 at the left top 210. Moreover, a divided area 240 at a right bottom is configured by inverting the divided area 210 at the left top.

Figure 2D:
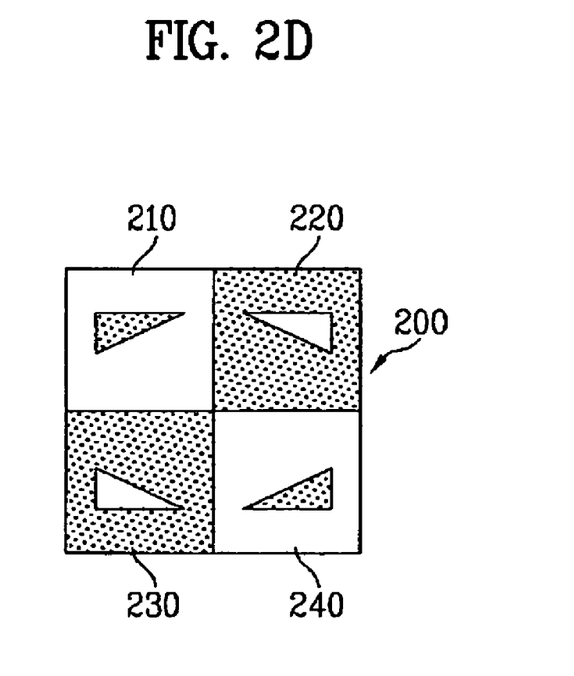

FIG. 2D shows that a divided area 220 at a right top is configured by performing inversion and right-to-left symmetrization on a divided area 210 at a left top. And, a divided area 230 at a left bottom is configured by performing inversion and right-to-left symmetrization on a divided area 210 at a left top. And, a divided area 230 at a left bottom is configured by performing top-to-bottom symmetrization and inversion on the divided area 210 at the left top. Moreover, a divided area 240 at a right bottom is configured by performing right-to-left symmetrization and top-to-bottom symmetrization on the divided area 210 at the left top.

Thus, it is understood that the reference pattern can be generated in various ways in addition to the embodiments shown in FIGS. 2A to 2D.

Figure 3:
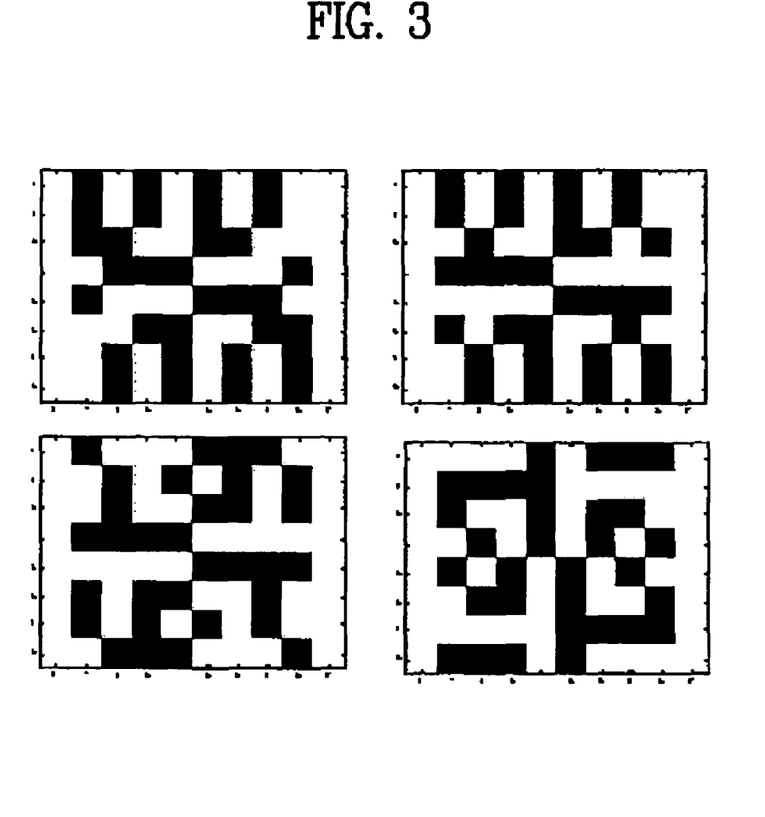
FIG. 3 is a diagram of reference patterns generated by the above reference pattern generating method by pixel unit.

FIG. 3 is a diagram of reference patterns generated by the above reference pattern generating method by pixel unit.

Referring to FIG. 3, the reference pattern is generated by the rule shown in FIG. 2D. In particular, the number of 'on' is equal to that of 'off'. And, the rest of three areas are generated by performing inversion, top-to-bottom symmetrization and right-to-left symmetrization on an area at a left top in the four divided areas shown in FIG. 2, respectively.

Figure 4:
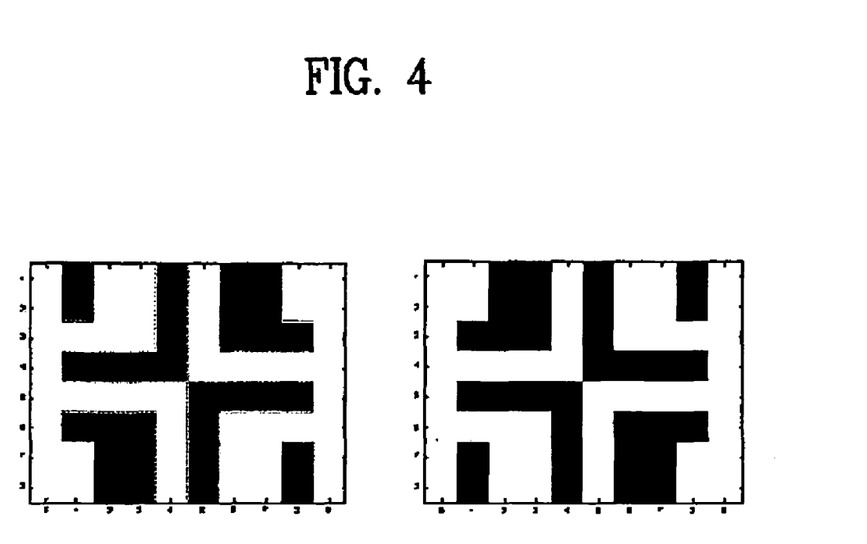
FIG. 4 is a diagram of a reference pattern according to one embodiment of the present invention.

FIG. 4 is a diagram of a reference pattern according to one embodiment of the present invention.

Referring to FIG. 4, a reference pattern is generated according to the rule shown in FIG. 2D. And, the present invention intends to protect a configuration of the reference pattern shown in FIG. 4 as well as a rule thereof. If the reference pattern shown in FIG. 4 is inverted or rotated, it generates the same reference pattern. If a divided area at a left top is inverted and symmetrized by a rule different from that shown in FIG. 4, it generates the same reference pattern.

Therefore, it is able to correct a data image using the generated reference pattern shown in one of FIGS. 2A to 4. The correction of the data image is possible by performing recording and reproduction by inserting a reference pattern within a corresponding data image.

In the following description, a method of determining a position for inserting a reference pattern in a data image and a method of inserting a reference pattern in a data image are explained in detail.

Figure 5:
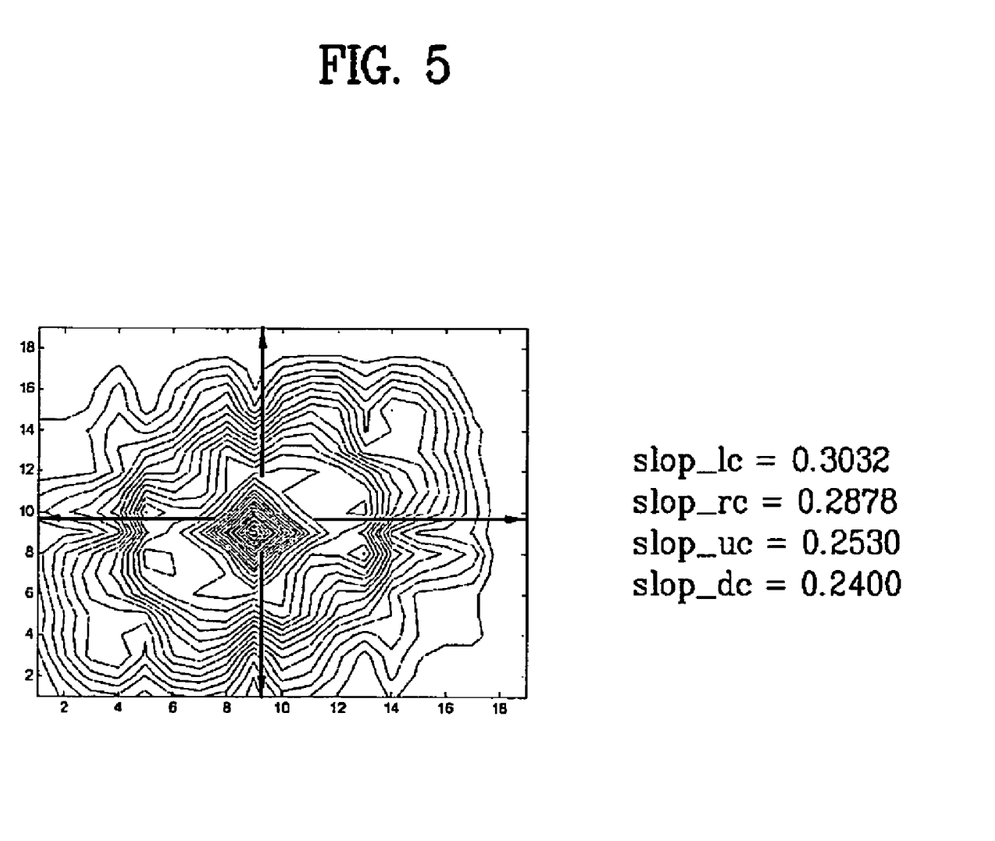
FIG. 5 is a diagram for a correlation coefficient of a reference pattern shown in FIG. 4.

FIG. 5 is a diagram for a correlation coefficient of a reference pattern shown in FIG. 4. Referring to FIG. 5, when the reference pattern shown in FIG. 4 is recorded in a recording medium and then reproduced, a correlation coefficient between a recorded reference pattern and a reproduced reference pattern is represented as a contour line. Each coefficient at a right side indicates a slope of a corresponding contour line. In particular, 'slop_lc' indicates a slope in a left direction, 'slop_rc' indicates a slope in a right direction, 'slop_uc' indicates a slope in an upper direction, and 'slop_dc' indicates a slope in a down direction.

If the slopes in the respective directions are compared to each other, it can be observed that there is no big difference. That is, when the reference pattern shown in FIG. 4 is recorded and reproduced, there is less distortion of the pattern itself. Therefore, it can be used as a reliable reference pattern.

Figure 6:
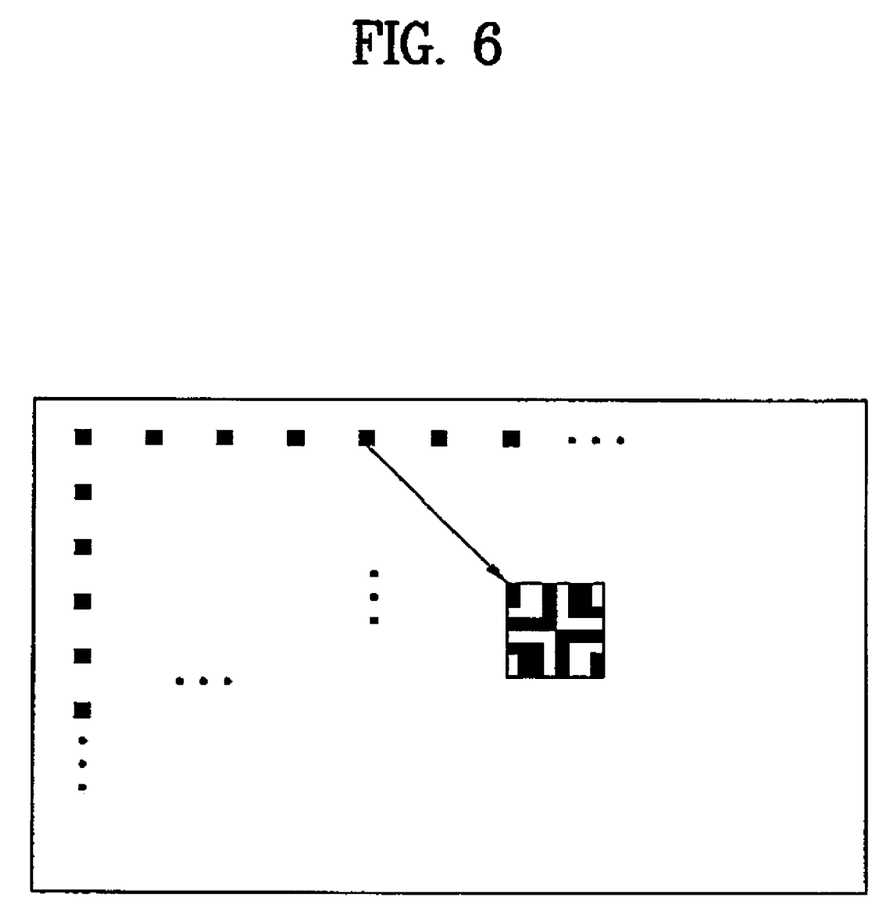
FIG. 6 is a diagram of a test image according to one embodiment of the present invention.

FIG. 6 is a diagram of a test image according to one embodiment of the present invention.

Referring to FIG. 6, a test image includes a plurality of reference patterns. The test image is the image for determining a position and space when a reference pattern is inserted in a data image by finding a distortion characteristic of a recording/reproducing apparatus.

The test image can include a reference pattern. In particular, the test image can be set to include the reference pattern only. In order to find the distortion characteristic of the recording/reproducing apparatus, the reference patterns, as shown in FIG. 6, can be inserted by being equally spaced from each other.

In FIG. 6, the reference patterns are arranged to be equally spaced from each other vertically or horizontally. Alternatively, the reference patterns are arranged to be equally spaced from each other vertically and horizontally. In this case, the space can be varied according to characteristic of the recording apparatus or a size of a data image to be recorded. The space between reference patterns can be controlled by pixel unit or pixel block unit.

Figure 7A:
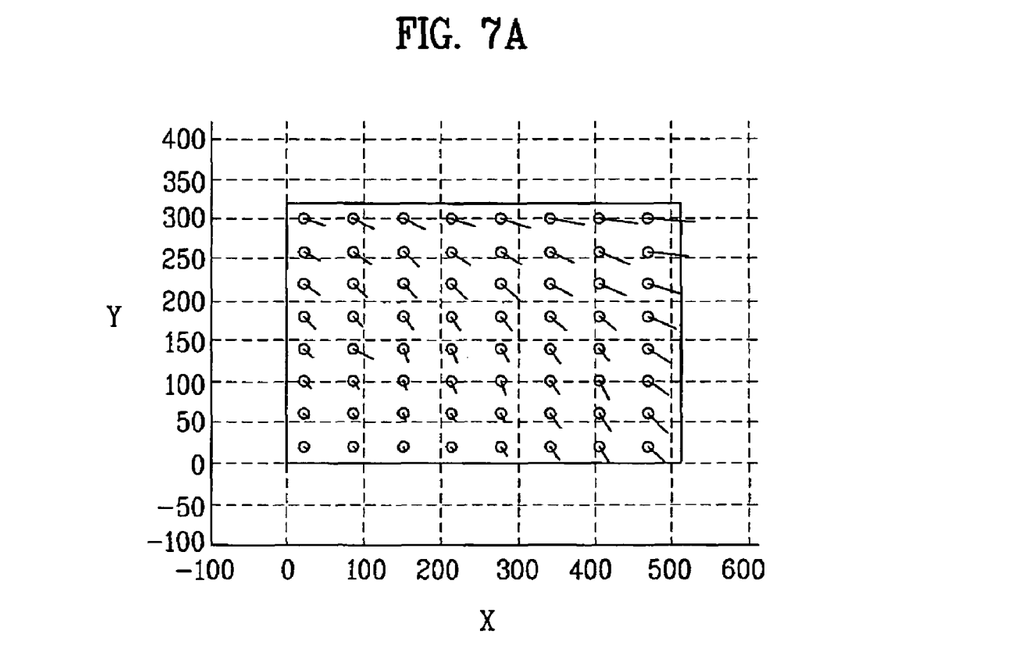
FIG. 7A is a diagram for distortion characteristics of a recording/reproducing apparatus, in which the distortion characteristics are found using the test image shown in FIG. 6.

FIG. 7A is a diagram for distortion characteristics of a recording/reproducing apparatus, in which the distortion characteristics are found using the test image shown in FIG. 6.

Referring to FIG. 7A, the distortion characteristics can be found in a manner of generating and recording a test image in a recording medium by the method shown in FIG. 6 and reproducing the recorded test image. When the test image is recorded in the recording medium, information on the test image can be simultaneously recorded in a recording apparatus or a recording medium. In particular, information on a shape of a reference pattern inserted in a test image, information on a position of a reference pattern inserted in a test image and the like are recorded in a recording apparatus or a recording medium.

Figure 7B:
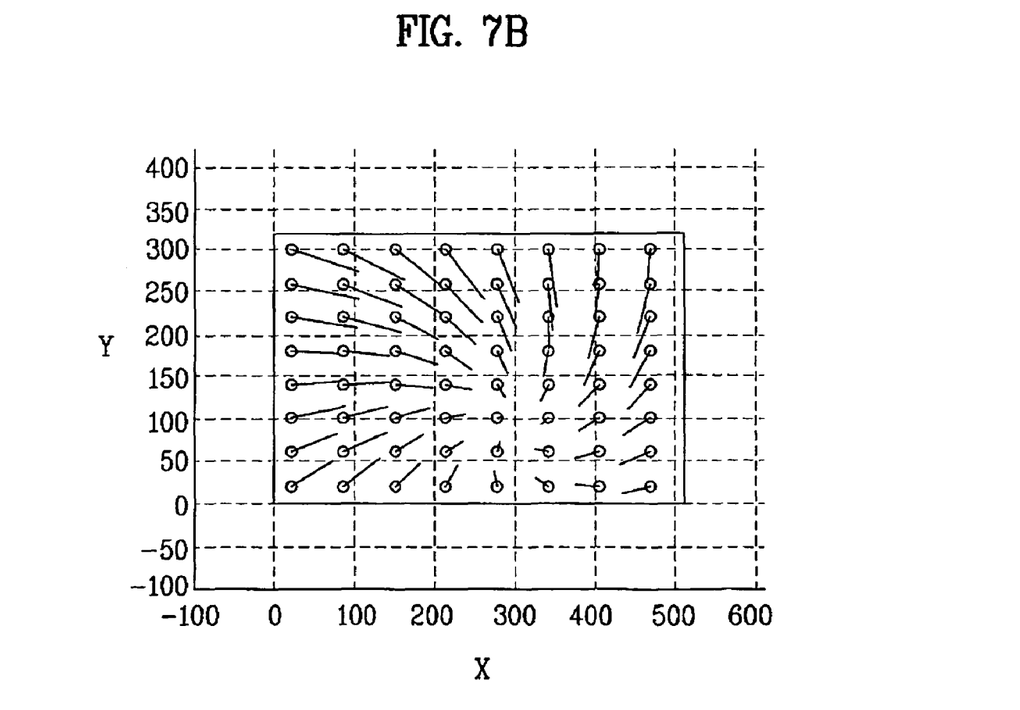
FIG. 7B is a diagram for distortion characteristics of another recording/reproducing apparatus.

When the recorded test image is reproduced and then recorded again, it is compared with the stored information on the test image. In this case, the corresponding comparison can be performed per reference pattern recorded in the test image. In particular, it is able to compare a position of each test image to a position of a reproduced reference pattern. In more particular, by comparing the recorded reference pattern and the reproduced reference pattern to each other, a shift distance and direction of each of the reference patterns can be found and represented. This results in FIG. 7A or FIG. 7B. A map indicating shift distances and shift directions before and after the recording of the reference pattern, as shown in FIG. 7A or FIG. 7B, can be named 'shift map'. And, the shift map can indicate distortion characteristics of a recording apparatus.

Each circle shown in FIG. 7A or FIG. 7B indicates a position of a reference pattern recorded in a recording medium. And, a straight line attached to the corresponding circle indicates a shift distance and a shift direction of the corresponding reference pattern. Moreover, horizontal and vertical axes shown in FIG. 7A or FIG. 7B indicate a size of each test image by pixel unit.

FIG. 7A and FIG. 7B show distortion characteristics of different recording apparatuses, respectively. In case of FIG. 7A, it can be observed that a distortion extent becomes lessened in a shift map toward a left bottom. And, it can be also observed that the distortion becomes stronger toward a right top. In case of FIG. 7B, it can be observed that the distortion becomes lessened toward a central area of a right bottom.

The distortion characteristic of the recording apparatus is the factor affected by an optical axis alignment and a part error of each recording apparatus despite the same kind of recording apparatus.

Therefore, it is necessary to compensate every recording apparatus. Preferably, like the present invention, the distortion characteristic of each recording apparatus is measured and compensated.

Figure 8:
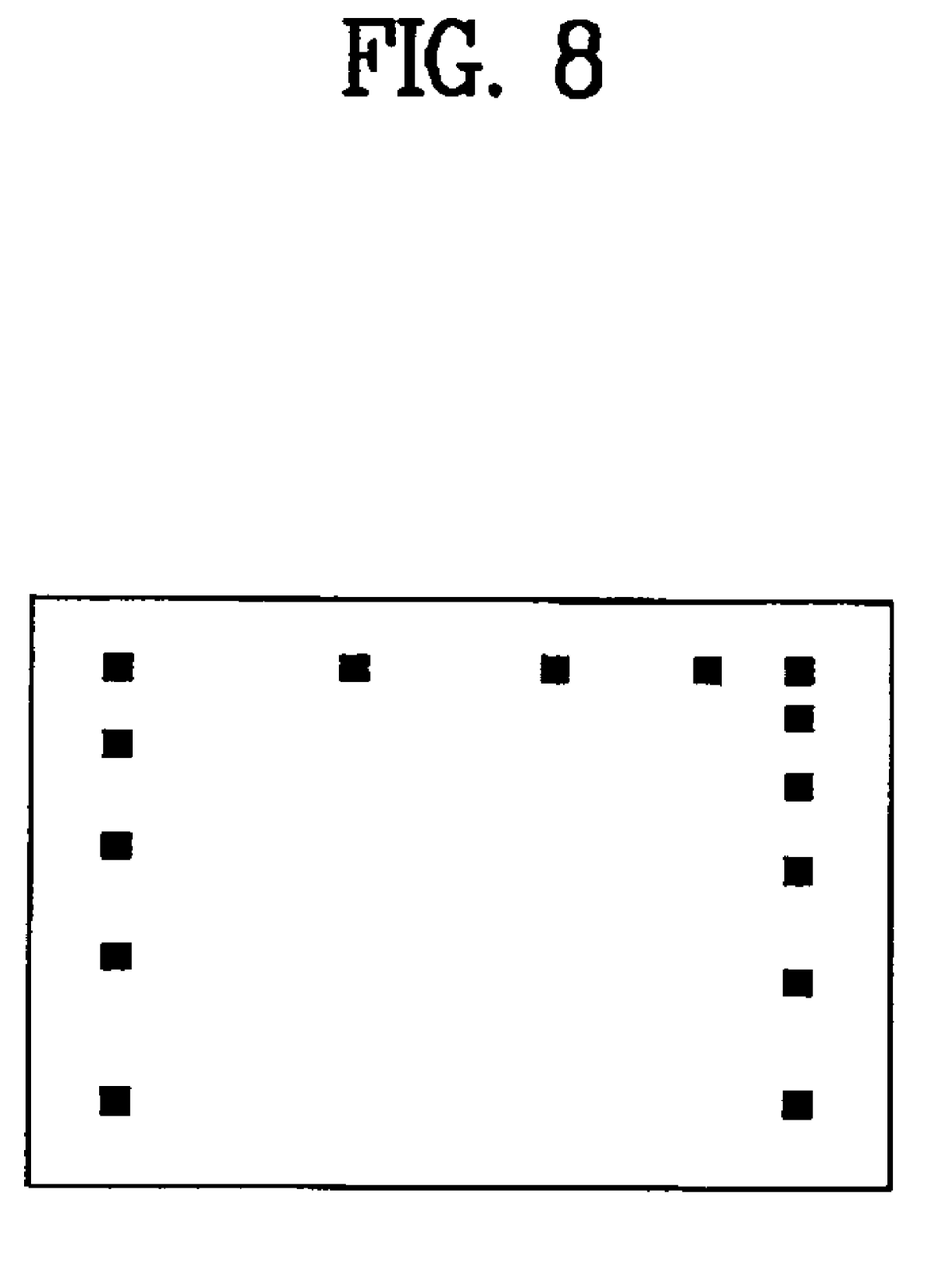
FIG. 8 is a diagram of a reference pattern inserted in a test image according to a distortion characteristic of a recording apparatus, in which the distortion characteristic is measured in advance.

FIG. 8 is a diagram of a reference pattern inserted in a test image according to a distortion characteristic of a recording apparatus, in which the distortion characteristic is measured in advance. In particular, FIG. 8 shows an embodiment for a reference pattern inserted if the distortion characteristic shows the aforesaid same characteristic shown in FIG. 7A.

Referring to FIG. 8, it can be observed that the distortion extent of a recording apparatus in the shift map shown in FIG. 7A gets stronger toward right top. Hence, it is able to arrange reference patterns more densely toward the right top that is the direction that the distortion gets stronger.

The reference pattern inserted in recording a data image can play a role in compensating a data image in reproducing the corresponding data image. For instance, a position and shape of a reference pattern inserted in a data image can be stored in a recording medium or a recording apparatus in advance. In reproducing a recording medium, by comparing a position of a previously stored reference pattern and apposition of a reproduced reference pattern to each other, it is able to consider a shift of a data image. Yet, it may show a different shift type per data image area. In this case, it is able to obtain a shift of a data image locally shifted per area using previously known information including a position and shape of a reference pattern.

In particular, by considering a position shift of a reference pattern inserted in a data image, it is able to compensate for a shift of data recorded in an area neighbor to each reference pattern. If the shift of the data image is not uniform across a whole data image, a position selection of a reference pattern may become a significant factor. By considering a shift position of a reference pattern, it is able to compensate for a position shift of data between reference patterns. If a space between reference patterns is too much greater than a distortion extent of a data image, it may be unable to perform effective correction. If a space between reference patterns is arranged denser than a distortion extent of a data image, it may reduce recording/reproducing efficiency of a recording medium.

In this case, if a distortion extent of a recording apparatus is found in advance through a test image and if a reference pattern is inserted correspondingly, the present invention enables efficient recording/reproduction of a recording medium.

Figure 9:
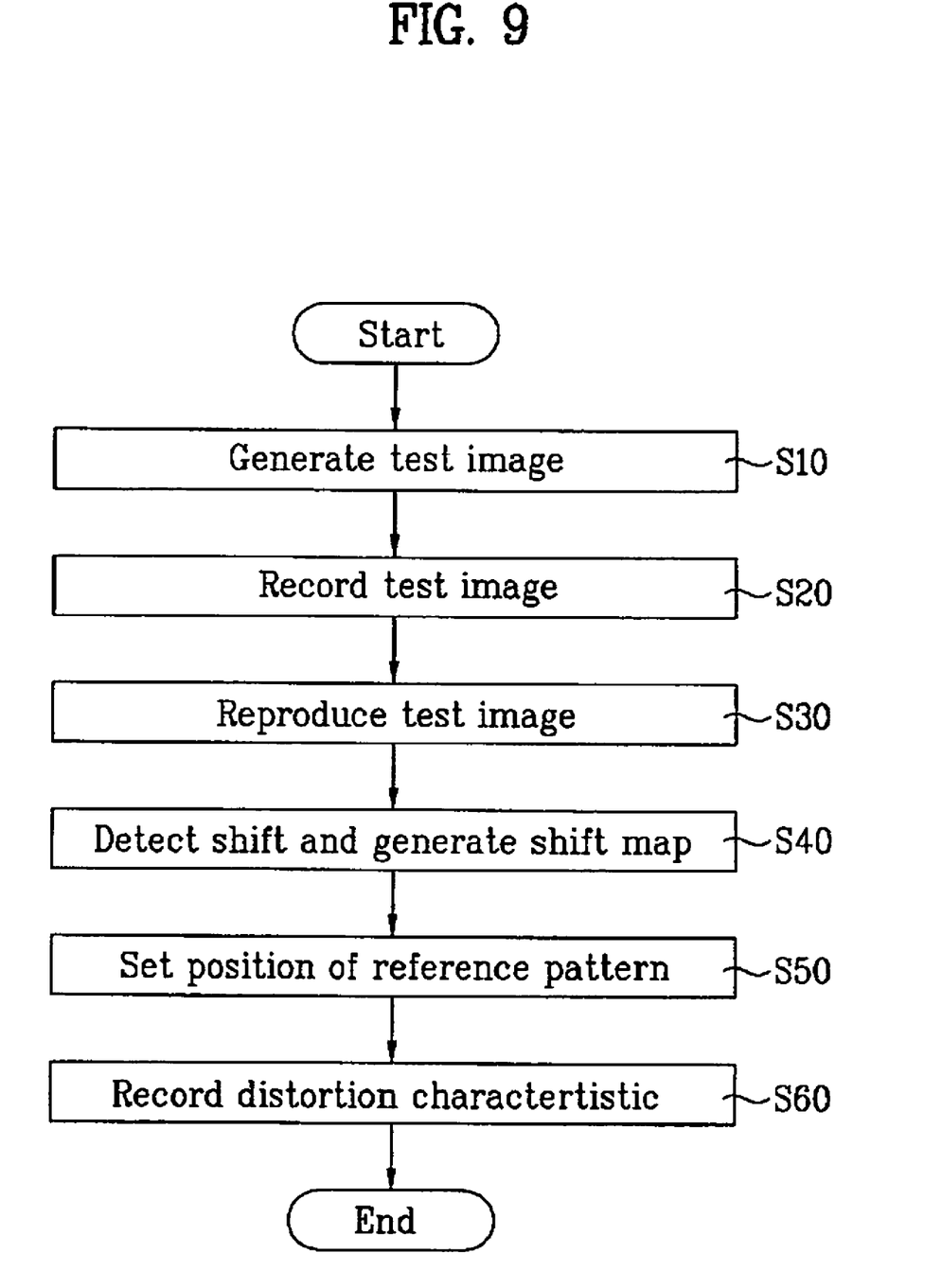
FIG. 9 is a flowchart of a method of measuring a distortion characteristic of a recording apparatus according to one embodiment of the present invention.

FIG. 9 is a flowchart of a method of measuring a distortion characteristic of a recording apparatus according to one embodiment of the present invention.

Referring to FIG. 9, a test image is generated [S10]. The descriptions for FIG. 6 can be referred to for a method of generating the test image. The test image is generated by a control unit of a recording apparatus and can be recorded in a recording medium via a light outputting unit [S20]. In case of a recording medium for recording, a test image is inserted in the recording medium in advance before sale.

When a test image is recorded in a recording medium, information on the test image can be temporarily stored in a recording apparatus. For instance, information on a shape of a reference pattern inserted in a test image and information on a space between reference patterns can be temporarily stored in a memory of a recording apparatus. If a recording medium having a test image recorded therein is delivered for sale, information on the test image can be recorded in a specific area of the recording medium.

The test image recorded for measuring the distortion characteristic of the recording apparatus is reproduced [S30]. By reproducing the test image, it is able to detect a position of the reference pattern recorded within the test image. The detected position of the reproduced reference pattern can be compared to a position of a reference pattern recorded within the recording apparatus or in a specific area of the recording medium. In this case, it is able to find a position shift between the corresponding reference patterns by comparing the position of the reproduced reference pattern and the position of the recorded reference pattern to each other. Moreover, by finding a position shift of the corresponding reference pattern, it is able to find a shift map [S40].

The shift map reflects the distortion characteristic of the recording apparatus. In particular, a shift characteristic within a test image is varied according to a combination of optical elements of the recording apparatus and optical axis alignment state. In considering a position of a reference pattern to be inserted in compensating a data image, it is able to use the shift map. Namely, it is able to set up an insertion position of a reference pattern using the shift map [S50]. For instance, in case of an area having a large shift amount of a reference pattern in a shift map, reference patterns can be set to be inserted with denser spaces. In case of an area having a relatively smaller shift amount of a reference pattern in a shift map, reference patterns can be set to be inserted with sparser spaces.

After the shift map has been created, the distortion characteristic of the recording apparatus is recorded in a storage space of the recording apparatus [S60]. In this case, the distortion characteristic of the recording apparatus can correspond to the formerly created shift map. Alternatively, the distortion characteristic may correspond to an insertion position of a reference pattern which is found using the shift map.

Figure 10:
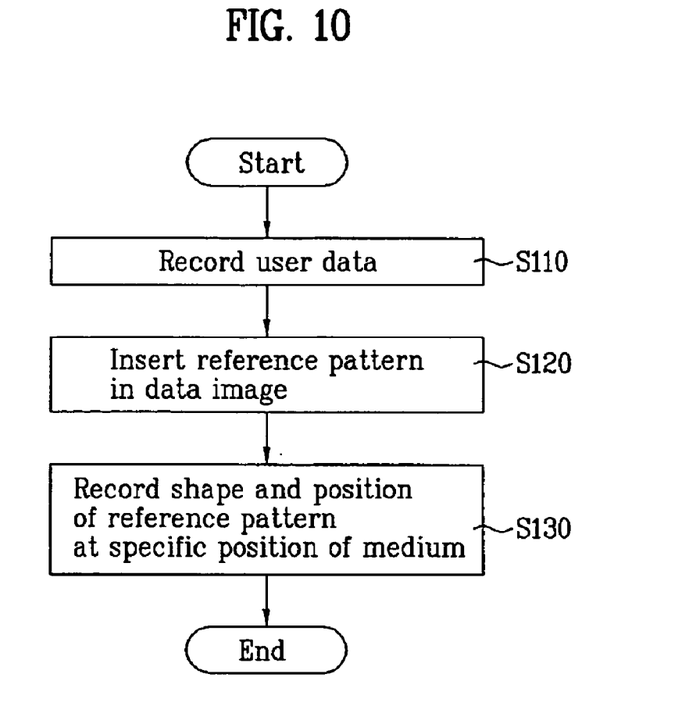
FIG. 10 is a flowchart for a method of recording method of a recording medium according to the present invention.

FIG. 10 is a flowchart for a method of recording method of a recording medium according to the present invention.

Referring to FIG. 10, a reference pattern is inserted in a data image [S110]. As mentioned in the foregoing description, an insertion position of the reference pattern is determined by reflecting the distortion characteristic of a recording apparatus. Alternatively, a reference pattern can be inserted by determining a position of the reference pattern using a shift map. In this case, reference patterns can be arranged more densely in an area having a strong distortion, i.e., in an area having a big shift between recording/reproduction. In case of a recording medium having a plurality of data images recorded therein, several different reference patterns can be repeatedly inserted periodically or with a prescribed rule.

Data image having the reference pattern inserted therein is recorded in the recording medium [S120]. In this case, an area for recording a data image can be allocated to the recording medium. For instance, in order to record a data image in a recording medium, an area in the name of a data area or a user data area can be allocated to the recording medium. As mentioned in the foregoing description, a signal light and a reference light are used for recording to perform the recording by causing interference. As mentioned in the foregoing description, by varying an incident angle, phase or wavelength of a reference light, it is able to record data images in the same area by overlapping the data images with each other.

Information on a position and shape of the reference pattern is recorded in the recording medium as well as the data image having the reference pattern inserted therein [S130]. In this case, it is able to record the information on the position and shape of the reference pattern in the recording medium by allocating a specific area to the recording medium. For instance, it is able to record information on the reference pattern by allocating a management area. For another instance, it is able to record information on the reference pattern by allocating a control information area to a lead-in area. Besides, in order to secure reliability, the information on the reference pattern can be recorded at least once.

Figure 11:
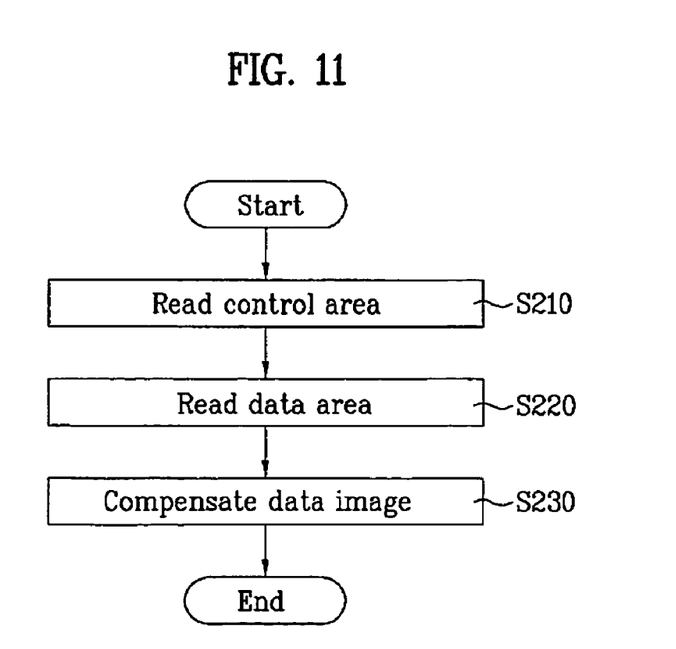
FIG. 11 is a flowchart for a method of reproducing a recording medium according to one embodiment of the present invention.

FIG. 11 shows a method of reproducing a recording medium according to one embodiment of the present invention. In particular, FIG. 11 is a flowchart for a method of reproducing a recording medium according to one embodiment of the present invention.

Referring to FIG. 11, an area for recording overall management information on a recording medium is read out [S210]. For clarity and convenience, such an area is named 'control area'. The control area includes information on a position and shape of a reference pattern inserted in each data image.

After the information on the reference pattern has been read out of the control area, a data image recorded in a data area is read out [S220]. As mentioned in the foregoing description, a reference pattern for correction has been inserted in the data image. Hence, the reference pattern inserted in the data image is read out while reading out the data image. In this case, a position of the reference pattern read out of the data image is compared to position information of the reference pattern recorded in the control area. By comparing the positions of the two kinds of the reference patterns to each other, it is able to find a shift amount of data in data image recording/reproduction. According to the found shift amount, it is able to correct the data of the data image area [S230].

Figure 12:
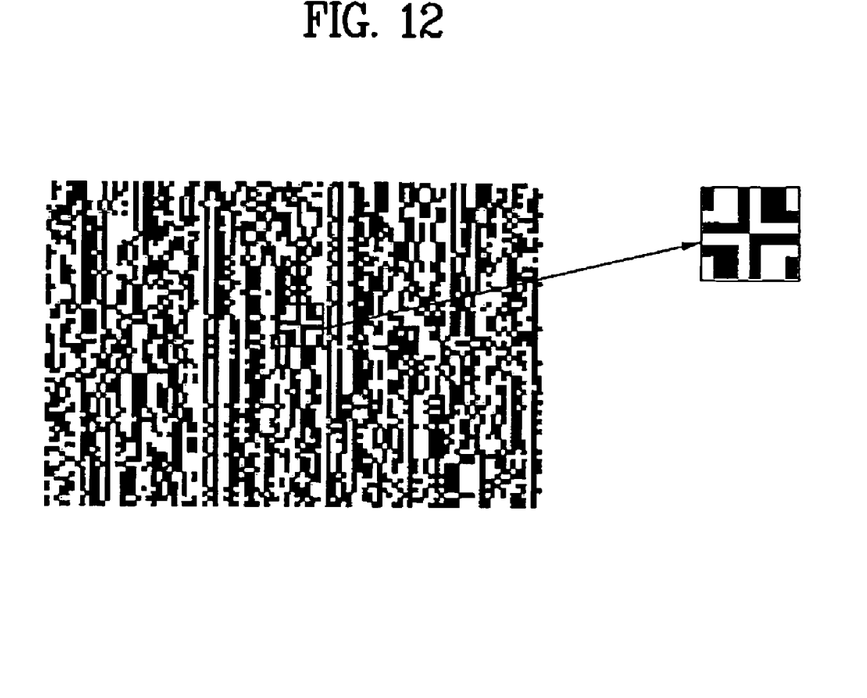
FIG. 12 is a diagram of an inserted reference pattern according to one embodiment of the present invention.

FIG. 12 is a diagram of an inserted reference pattern according to one embodiment of the present invention.

Referring to FIG. 12, reference patterns of the present invention can be inserted in various spots of a data image. A position of the inserted reference pattern can be recorded in a recording medium recording/reproducing apparatus. And, it is able to detect a shift of the data image itself by comparing a recorded position and a reproduced position with reference to the recorded position of the inserted reference pattern. Alternatively, by detecting a distortion extent of the pattern itself, it is able to detect a distortion extent of the data image. The detected shift and distortion of the image is usable in correcting the reproduced data image.

Figure 13:
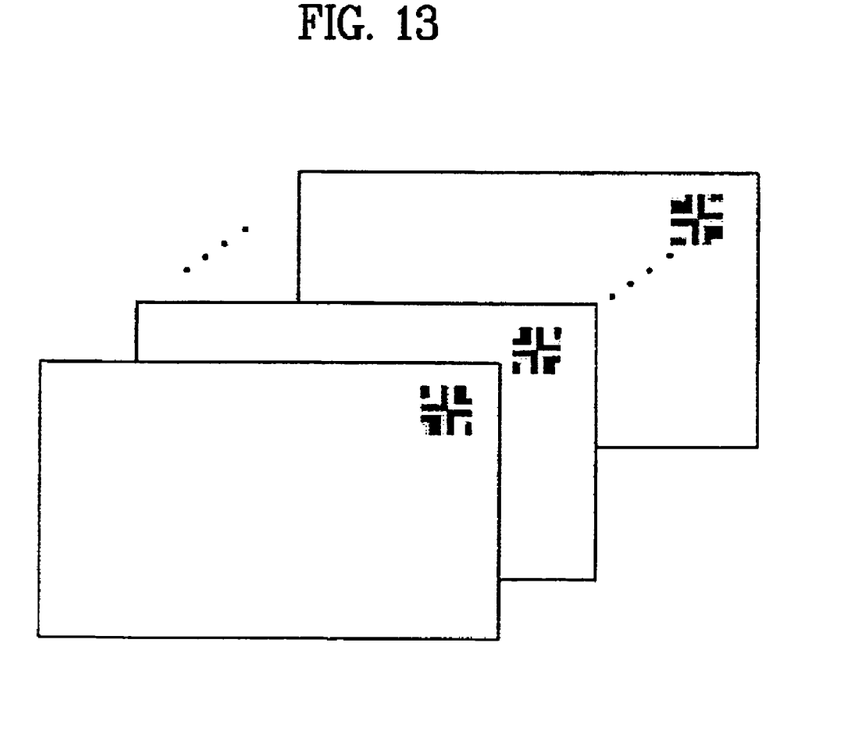
FIG. 13 is a diagram of an inserted reference pattern according to one embodiment of the present invention.

FIG. 13 is a diagram of an inserted reference pattern according to one embodiment of the present invention.

Referring to FIG. 13, a reference pattern according to the present invention can be inserted in a plurality of data images. In this case, it is able to vary a shape of the reference pattern, which will be inserted between data images neighbor to each other, to minimize interference between the two neighboring data images. For instance, by inverting a shape of a reference pattern inserted in a former data image, as shown in FIG. 13, it is able to insert the inverted reference pattern in the latter image. In this case, as mentioned in the foregoing description, the rule for varying the shape of the reference pattern can use the symmetrization, the inversion or the rotation. Alternatively, it is able to use the pattern having the same shape according to the characteristic of a recording apparatus or a selection made by a manufacturer.

The correction of data image using a reference pattern can be performed per data image or on each data image with a predetermined space in-between. Alternatively, the correction can be performed on a designated specific data image only.

Moreover, a data area can be extracted as well as an image is corrected using a reference pattern. By storing a position and shape of a reference pattern in such a storage space as a memory and a buffer of a recording apparatus in case of recording a data image, the position of the reference pattern is searched to extract an area of the data image in case of reproduction.

Alternatively, a recorded position and shape of a reference pattern are recorded in a control data area of a recording medium to be used for a reproduction of the recording medium.

Data image can be discriminated using a reference pattern. In case of a holography recording medium of the present invention, a plurality of data images can be recorded in a specific area by being overlapped with each other, which may cause a problem of interference and the like. In this case, a different reference pattern is inserted in each data image and a position and shape of the inserted reference pattern are stored in a recording/reproducing apparatus or in a control area of a recording medium.

Accordingly, the present invention provides the following effects and/or advantages.

First of all, the present invention effectively compensates a data image and facilitates micro-distortion and the like to be detected and compensated, thereby enhancing q quality of reproduced data.

Secondly, the present invention measures a distortion extent according to a system configuration, thereby effectively compensating for the distortion.

Thirdly, the present invention performs a recording on a recording medium by reflecting characteristics of a recording apparatus, thereby enabling an additional recording or reproduction by considering the corresponding recording.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording method of a recording medium, comprising the steps of:
   measuring a distortion characteristic of a recording device using a test image;
   determining an inter-reference pattern space within a data image according to the measured distortion characteristic;
   inserting a reference pattern in the data image according to the determined inter-reference pattern space; and
   recording the data image including the reference pattern on the recording medium,
   wherein the reference pattern includes multiple divided areas, and the multiple divided areas are in a relation of inversion and/or rotation and/or symmetrization.

2. The recording method of claim 1, wherein the test image is configured in a manner of the reference pattern is arranged by equally spaced in horizontal and vertical directions.

3. The recording method of claim 1, the distortion characteristic measuring step comprising the steps of:
   recording the test image;
   reproducing the test image; and
   comparing the recorded test image and the reproduced test image to each other.

4. The recording method of claim 3, the test image comparing step comprising the step of finding a position shift of a corresponding reference pattern within the test image before and after reproduction of the corresponding reference pattern.

5. The recording method of claim 4, the position shift finding step comprising the step of finding a shift distance and a shift direction.

6. The recording method of claim 1, wherein the number of 'on' of the reference pattern is equal to the number of 'off' of the reference pattern.

7. The recording method of claim 1, wherein the reference patterns are used in different shapes within a single data image.

8. The recording method of claim 7, wherein the reference patterns in the different shapes are in the relation of the inversion and/or the rotation and/or the symmetrization.

9. The recording method of claim 1, wherein the reference pattern differing in shape is inserted in each of a plurality of data images.

10. The recording method of claim 9, wherein the reference patterns of each of a plurality of the data images are in the relation of the inversion and/or the rotation and/or the symmetrization.

11. The recording method of claim 1, wherein information on a position of the recorded reference pattern and pattern information of the reference pattern are recorded in the recording medium.

12. A recording apparatus for recording data on a recording medium, comprising:
   a light outputting unit configured to record data on the recording medium; and
   a control unit configured to:

measure a distortion characteristic of the recording apparatus using a test image, determine an inter-reference pattern space within a data image according to the measured distortion characteristic, insert a reference pattern in a data image according to the determined inter-reference pattern space; and control the light outputting unit to record the data image including the reference pattern on the recording medium, wherein the reference pattern includes multiple divided areas, and the multiple divided areas are in a relation of inversion and/or rotation and/or symmetrization.

13. The recording apparatus of claim 12, wherein the control unit is configured to configures the test image by arranging the reference pattern in 2-dimension and equally spacing the reference pattern.

14. The recording apparatus of claim 12, wherein the control unit is configured to measures the distortion characteristic in a manner of recording the test image, reproducing the test image, and comparing the recorded test image and the reproduced test image to each other.

15. The recording apparatus of claim 14, wherein the control unit is configured to compares a recorded test image and a reproduced test image to each other by finding a shift between a recorded position and a reproduced position of the corresponding reference pattern within the test image.

16. The recording apparatus of claim 15, wherein the control unit is configured to find the shift between the positions by finding a shift distance and a shift direction of the reference pattern.

* * * * *